US008271161B2

(12) United States Patent
Meehan et al.

(10) Patent No.: US 8,271,161 B2
(45) Date of Patent: Sep. 18, 2012

(54) METHOD AND SYSTEM FOR SECURELY STORING ODOMETER INFORMATION IN AN AUTOMOBILE

(75) Inventors: Terence L. Meehan, Williamston, MI (US); Kenneth M. Hromada, Sterling Heights, MI (US); Steven A. Stringfellow, Oakland, MI (US); Kevin E. Fondaw, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1628 days.

(21) Appl. No.: 11/670,550

(22) Filed: Feb. 2, 2007

(65) Prior Publication Data

US 2008/0189006 A1   Aug. 7, 2008

(51) Int. Cl.
*G01C 22/00* (2006.01)
*G01M 17/007* (2006.01)
*G06F 19/00* (2011.01)

(52) U.S. Cl. ...... 701/33.4; 701/498; 701/32.5; 340/457; 340/438

(58) Field of Classification Search .................. 701/211, 701/213, 29, 36, 35, 67; 340/476, 438; 702/168
See application file for complete search history.

(56) References Cited

U.S. PATENT DOCUMENTS

| | | | |
|---|---|---|---|
| 4,258,421 A * | 3/1981 | Juhasz et al. ................. | 701/33.2 |
| 5,497,323 A * | 3/1996 | McCall et al. ............... | 701/32.5 |
| 5,541,858 A * | 7/1996 | Warner ......................... | 702/165 |
| 5,673,018 A * | 9/1997 | Lowe et al. ................... | 340/445 |
| 5,924,057 A * | 7/1999 | Kell .............................. | 702/165 |
| 5,936,315 A * | 8/1999 | Lais ............................. | 307/10.1 |
| 5,961,571 A * | 10/1999 | Gorr et al. .................... | 701/494 |
| 6,044,315 A * | 3/2000 | Honeck et al. ............... | 701/33.4 |
| 6,188,972 B1* | 2/2001 | Kobayashi et al. ........... | 702/165 |
| 6,374,190 B2* | 4/2002 | Schupfner ..................... | 702/94 |
| 6,470,253 B1* | 10/2002 | Salecker et al. .............. | 701/67 |
| 6,519,516 B2* | 2/2003 | Pfaeffle et al. ............... | 701/32.6 |
| 6,768,966 B2* | 7/2004 | Ohle et al. .................... | 702/165 |
| 6,801,855 B1* | 10/2004 | Walters et al. ................ | 701/410 |
| 6,816,785 B2* | 11/2004 | Leimbach et al. ............ | 701/445 |
| 6,856,933 B1* | 2/2005 | Callaghan ..................... | 702/149 |
| 6,954,141 B2* | 10/2005 | Sekizawa et al. ............. | 340/447 |
| 6,961,671 B2* | 11/2005 | Ko ................................ | 702/168 |
| 7,126,579 B2* | 10/2006 | Ritter ............................ | 345/156 |
| 7,135,961 B1* | 11/2006 | Operowsky et al. ......... | 340/425.5 |
| 7,224,268 B2* | 5/2007 | Sekizawa ...................... | 340/442 |
| 7,495,549 B2* | 2/2009 | Acres ............................ | 340/427 |
| 7,508,682 B2* | 3/2009 | Badarinarayan et al. ..... | 361/797 |
| 7,610,128 B2* | 10/2009 | O'Connor et al. ............ | 701/32.5 |
| 7,693,896 B1* | 4/2010 | Raines .......................... | 707/706 |
| 7,756,617 B1* | 7/2010 | Cluff et al. .................... | 701/33.4 |
| 2003/0055599 A1* | 3/2003 | Ohle et al. .................... | 702/158 |
| 2008/0189006 A1* | 8/2008 | Meehan et al. ................ | 701/29 |

FOREIGN PATENT DOCUMENTS

JP    2006047002 A  *  2/2006

\* cited by examiner

*Primary Examiner* — Thomas G. Black
*Assistant Examiner* — Wae Louie
(74) *Attorney, Agent, or Firm* — Ingrassia Fisher & Lorenz, P.C.

(57) ABSTRACT

A method and system, according to one embodiment of the present invention, provide a means to securely store odometer information in an automobile. A distance traveled by the automobile is calculated. The distance traveled is then stored in both a first and second memory unit within the automobile.

17 Claims, 2 Drawing Sheets

METHOD AND SYSTEM FOR SECURELY STORING ODOMETER INFORMATION IN AN AUTOMOBILE

TECHNICAL FIELD

The present invention generally relates to automobiles, and more particularly relates to a method and system for storing odometer information in an automobile.

BACKGROUND OF INVENTION

In recent years, advances in technology, as well as ever-evolving tastes in style, have led to substantial changes in the techniques used to build and design automobiles. One of the changes involves the complexity of the various electrical systems within automobiles.

Modern automobiles often employ dozens of electrical systems for monitoring and controlling virtually every aspect of operation. One task performed involves the calculation and storage of various types of information about the particular automobile, including the "odometer value," or the total distance the automobile has been driven. Typically, the odometer value is calculated and stored in a single electronic control module (ECU). As such, if the particular ECU is identified and located, there is a possibility that the odometer value for the automobile could be modified to read a lower value than the actual number of miles driven. Additionally, if it is discovered that the odometer value has been altered, it may be extremely difficult, if not impossible, to determine and reset the odometer to the correct value. If it is discovered that the odometer value has been tampered with, the value of the automobile is greatly reduced.

Accordingly, it is desirable to provide a method and system for securely calculating, accumulating, and storing odometer information in an automobile. In addition, it is desirable to provide a system and method for resetting the odometer value in an automobile to the correct value once it has been altered. Other desirable features and characteristics of the present invention will become apparent from the subsequent detailed description and the appended claims, taken in conjunction with the accompanying drawings and the foregoing technical field and background.

SUMMARY OF INVENTION

A method for calculating and storing odometer information in an automobile is provided according to one aspect of the present invention. A distance traveled by the automobile is calculated. The distance traveled is stored in a first memory unit within the automobile. The distance traveled is also stored in a second memory unit within the automobile.

A computing system for use in an automobile is provided according to another aspect of the present invention. The computing system includes at least one processor configured to calculate a distance traveled by the automobile, a first memory unit in operable communication with the at least one processor and configured to store the distance traveled by the automobile, and a second memory unit in operable communication with the at least one processor and configured to store the distance traveled by the automobile.

An automobile is provided according to another aspect of the present invention. The automobile includes a frame, a first automotive control module coupled to the frame including a first processor and a first memory storage unit, the first processor configured to calculate odometer information and the first memory storage unit configured to store the odometer information, a second automotive control module coupled to the frame including a second processor and a second memory storage unit, the second processor configured to calculate the odometer information and the second memory storage unit configured to store the odometer information, and a third automotive control module coupled to the frame including a third memory unit configured to store the odometer information and a display unit to display the odometer information to a user of the automobile.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the schematic diagrams shown herein depict example arrangements of elements, additional intervening elements, devices, features, or components may be present in an actual embodiment.

Figure 1:
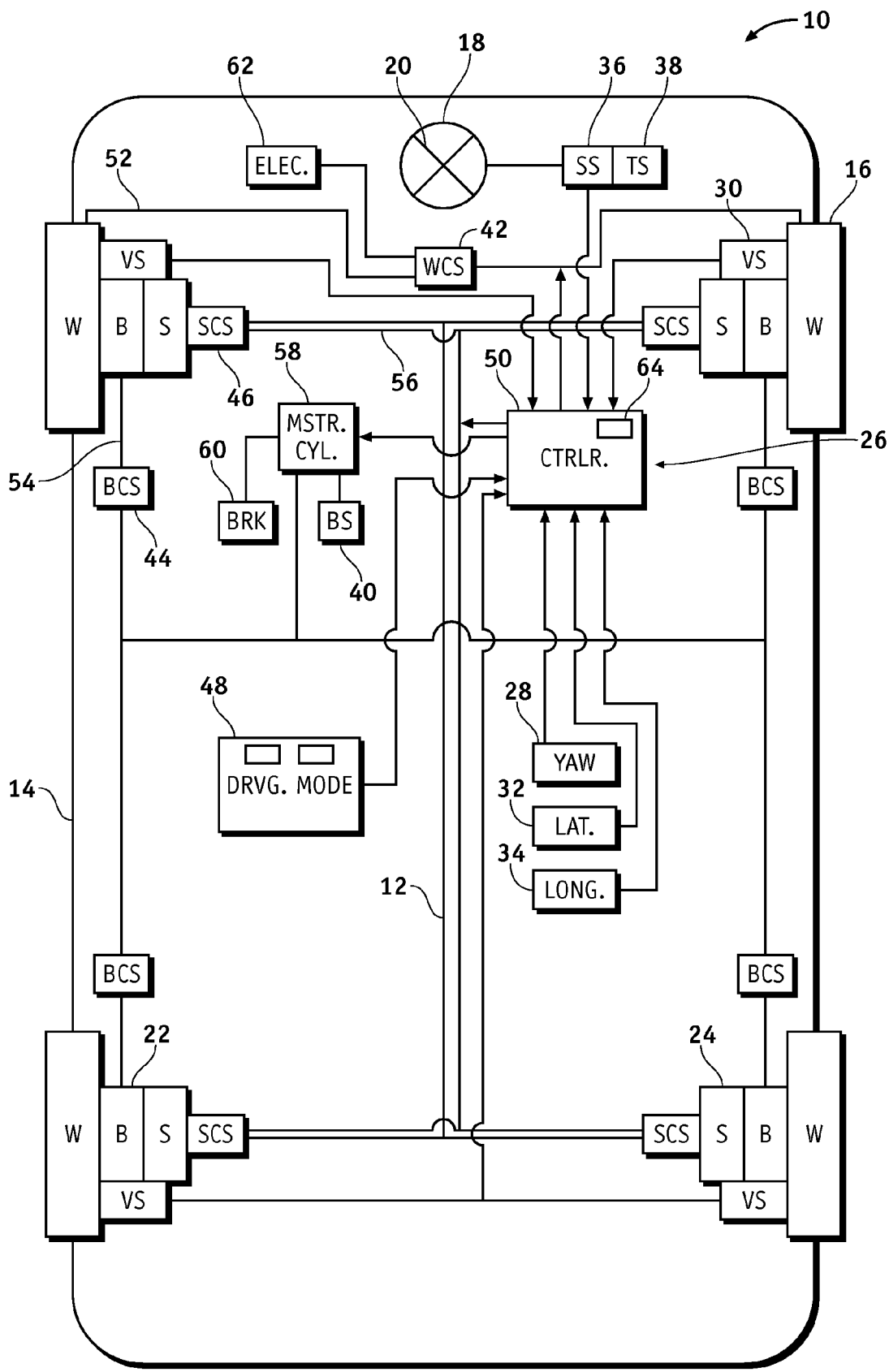
FIG. 1 is a schematic view of an automobile including a central control system.

FIG. 1 illustrates a vehicle 10, or "automobile", according to one embodiment of the present invention. The automobile 10 includes a chassis 12, a body 14, four wheels ("W") 16, a steering mechanism 18, a steering wheel 20, a braking mechanism 22, a suspension mechanism 24, and an electronic control system 26. The body 14 is arranged on the chassis 12 and substantially encloses the other components of the automobile 10. The body 14 and the chassis 12 may jointly form a frame. The wheels ("W") 16 are rotationally coupled to the chassis 12 near the respective four corners of the body 14. The steering mechanism 18 is mechanically coupled to and arranged for steering the wheels 16 by transferring a driver commanded steering torque on the steering wheel 20 to at least some of the wheels 16 and providing the driver with tactile feedback regarding the steering mechanism 18.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). Although not shown, the vehicle 10 may also incorporate any one of, or combination of, a number of different types of engines, such as, for example, a gasoline or diesel fueled combustion engine, a "flex fuel vehicle" (FFV) engine (i.e., a mixture of gasoline and alcohol), a gaseous compound (e.g., hydrogen and natural gas) fueled engine, a combustion/electric motor hybrid engine, and an electric motor. As will be appreciated by one skilled in the art, in an embodiment in which the automobile 10 is 4WD or AWD, the engine is mechanically coupled to all of the wheels. Additionally, as will be appreciated by one skilled in the art, the automobile 10 may include numerous additional components which are not shown in FIG. 1.

Both the braking mechanism 22 and the suspension mechanism are disposed between the wheels 16 and the chassis 12. The braking mechanism ("B") 22 is arranged for decelerating the wheels 16 upon command, and the suspension mechanism ("S") provides damping vibration at the wheels 16. Steering mechanism 18, braking mechanism 22, and suspension mechanism 24 are alternatively referred to as vehicle subsystems. As shown, the braking mechanism 22 and the suspension mechanism 24 may include multiple individual brakes ("B") and shock/strut assemblies ("S").

The electronic control system 26 includes a yaw rate sensor 28, a wheel velocity (or speed) sensor ("VS") 30 for each of the wheels 16, a lateral acceleration sensor 32, and a longitudinal acceleration sensor 34. The electronic control system 26 also includes a steering angle sensor ("SS") 36, a steering torque sensor ("TS") 38, and a brake pressure sensor ("BS") 40.

The electronic control system 26 further includes a steering mechanism control system ("WCS") 42, a braking mechanism control system ("BCS"), a suspension mechanism control system ("SCS") 46, and a driving mode switch 48. The electronic control system 26 also includes a central control system 50 is arranged in operable communication with sensors 28, 30, 32, 34, 36, 38, and 40, and mechanism control systems 42, 44, and 46. The central control system 50 may also include numerous automotive control modules, or electronic control units (ECUs), as will be discussed in greater detail below.

Control lines 52, 54, and 56, are depicted, for simplicity, as single lines, but represent both signal communication lines and operational links for communicating with and actuating the mechanism control systems 42, 44, and 46, respectively. The BCS 44 is in operable communication with the central control system 50 via a brake master cylinder 58, which in turn is in operable communication with a brake pedal 60. The braking mechanism 22 may be operated by the driver via the brake pedal 60 and the master cylinder 58, or by the controller 200 via the ICCS 26, the master cylinder 58, and brake mechanism control system 44. A vehicle electrical system 62 provides electrical power to all of the vehicle's electrically operated systems, including the control system 50 and the mechanism control systems 42, 44, and 46.

The central control system 50 includes at least one processor and/or a memory 64 for calculating and storing odometer information (i.e., the total distance the automobile has been driven), as will be described in greater detail below and includes instructions stored thereon (or in another computer-readable medium) for carrying out the processes and methods as described below.

Figure 2:
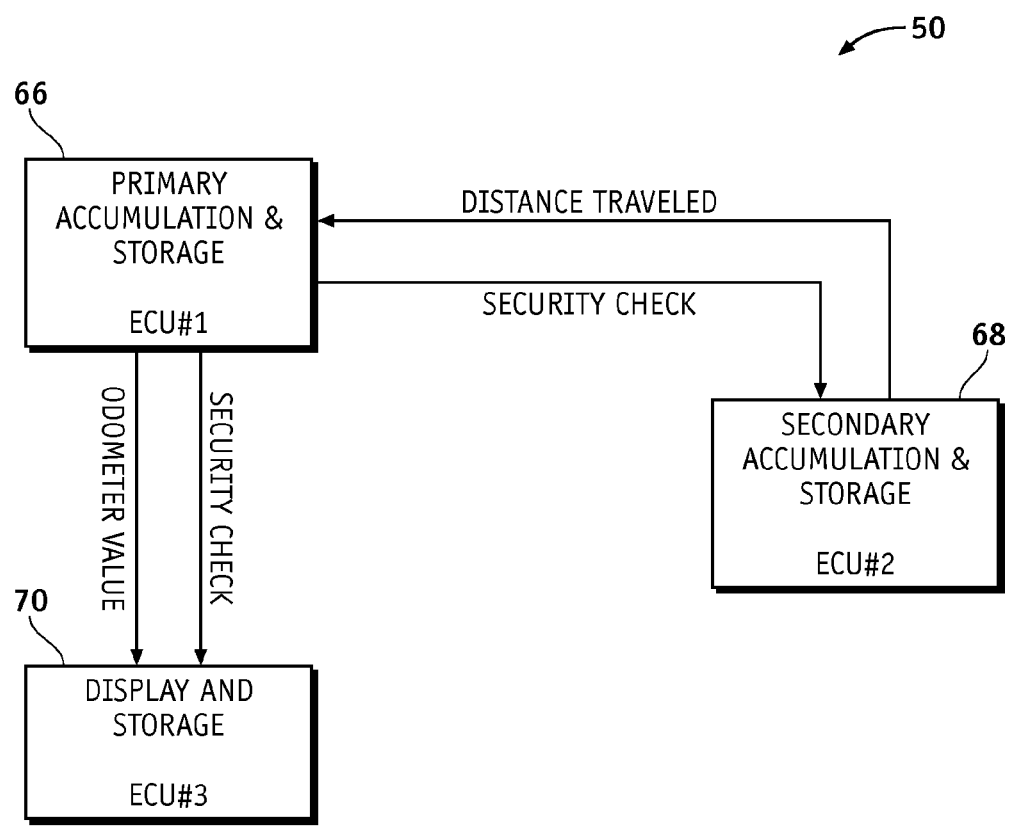
FIG. 2 is a block diagram illustrating the central control system in FIG. 1 in greater detail.

FIG. 2 illustrates a method and/or system for securely storing the odometer information of the automobile 10. In particular, FIG. 2 illustrates the central control system 50 in greater detail. In the embodiment shown, the central control system 50 includes a first ECU 66, a second ECU 68, and a third ECU 70. Although not specifically illustrated in FIG. 2, each of the ECUs 66, 68, and 70 may include individual microprocessors and memory storage units, such as non-volatile memories. Additionally, each of the ECUs may be in the form of computer modules that are responsible for controlling a particular aspect of the automobile, as is commonly understood in the art. Each of the ECUs 66, 68, and 70 may be, for example, a body control module (BCM), an electronic control module (ECM), a powertrain control module (PCM), a transfer case shift control module, an inflatable restraint sensing and diagnostic module, a theft deterrent control module, a memory seat module, a driver information center (DIC), a suspension control module, and an electronic brake control module (EBCM), or an instrument panel cluster (IPC).

Additionally, it should be understood that although only three ECUs 66, 68, and 70 are depicted and are located in a central location within the central control system 50, the automobile 10 may contain literally dozens (or more) ECUs which are located in various places throughout the frame.

In one embodiment, the first ECU 66 is a BCM, the second ECU 68 is an ECM, and the third ECU 70 is an IPC. As will be appreciated by one skilled in the art, both the BCM and the ECM may be "essential" components for the automobile 10. That is, central control system 50 and/or the automobile 10 may be configured such that the automobile 10 will not operate if either the BCM or the ECM is removed from the automobile. Likewise, if such an ECU is damaged, such as while an attempt is being made to alter the odometer value, the automobile may be rendered completely inoperative. The third ECU 70, or the IPC, may also include a display unit for displaying various types of information to a user of the automobile, such as odometer, speedometer, and tachometer information.

In use, referring to FIG. 1, the engine of the automobile is started and the automobile is driven. As the wheels 16 rotate, the wheel speed sensors 30 send signals to the central control system 50. Referring again to FIG. 2, both the first ECU 66 and the second ECU 68 receive the signals from the wheel speed sensors 30 and calculate, accumulate, and store odometer information, such as the total distance the automobile 10 has been driven. In this way, the control system 50 includes two (or more) independent means for calculating and storing the pertinent odometer information for the automobile. As will be appreciated by one skilled in the art, the odometer information that is calculated and stored in the first ECU 66 and the second ECU 68 may be units other than what is typically displayed to the user by the IPC, such as fractions of meters.

As indicated in FIG. 2, the odometer information, or an odometer value, such as the odometer information converted to miles, is also sent to the third ECU 70 where it is stored and displayed to the user of the automobile. In the embodiment shown, the third ECU 70 does not independently perform the calculation of the odometer information, but rather receives the appropriate information from the first ECU 66.

Still referring to FIG. 2, the control system 50 also performs a "security check" between the ECUs 66, 68, and 70. In one embodiment, the first ECU 66 (e.g., the BCM) transmits a "key," or security check value, to the second ECU 68 (e.g., the ECM) and the third ECU 70 (e.g., the IPC). As will be appreciated by one skilled in the art, the correct security check value for each automobile may be kept by the manufacturer of the automobile and retrieved using, for example, the vehicle identification number (VIN) of the particular automobile.

Both the second and third ECUs 68 and 70 are pre-programmed with the same security check value, and if the security check value received from the first ECU 66 does not match the security check value in either the second or third ECUs 68 and 70, the control system 50 creates an error message. The error message is sent to the IPC where an appropriate signal is provided to the user (e.g., displaying "ERROR" in the display unit). As such, the user (or an automotive technician) will be alerted that an attempt may have been made to alter the odometer reading on the automobile by replacing one of the ECUs 66, 68, and 70.

In the event of an error, the accumulation and storage of the odometer information continues in both the first and second ECUs 66 and 68. However, the ECU which has the incorrect security check value is flagged to indicate the possibility that it may not be the ECU that was originally installed in the automobile.

In one embodiment, if the automobile is driven a predetermined amount of time (or a predetermined number of miles) with the control system 50 detecting the error, the error signal that is provided to the user is permanently displayed on the IPC (or "locked" on the display unit), even if the appropriate ECU is then replaced with one having the correct security check value. In this way, even if the appropriate ECU is installed into the car after a prolonged period of time (or number a miles driven), the user will still be alerted of the error.

However, if an appropriate ECU is installed in the automobile before the predetermined amount of time, the correct odometer value (from an ECU that has not been removed from the automobile) may be transmitted to the replacement ECU so that the replacement ECU may continue to properly accumulate and store the odometer information for the vehicle.

While there are numerous advantages provided that are not expressly or implicitly described herein, one advantage of the method and system described above is that because the odometer information is calculated, accumulated, and stored in several separate locations in the automobile, the likelihood that the odometer reading on the automobile can be successfully altered is reduced. As a result, the value of the automobile, in both the new and used markets, is increased. Another advantage is that because an error message is displayed to the user, the fact that one of the appropriate ECUs does have the correct security value may be easily determined. A further advantage is that because the error message is permanently displayed once the automobile has been driven a predetermined number of miles with the error, even if an appropriate replacement ECU is installed in the car, the error message continues to be displayed. As such, the user is alerted of possible odometer value tampering. However, the ability to drive the automobile a given distance with the error message gives an automobile technician an opportunity to diagnose possible malfunctions by temporarily replacing particular ECUs. An even further advantage is that because the odometer information is stored in essential ECUs, an additional deterrence from tampering with the odometer value is provided.

Other embodiments may utilize different numbers of ECUs. For example, the calculation and accumulation of the odometer information may take place in more than two or three ECUs. Additionally, other types of ECUs, such as non-essential ECUs, may be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for managing odometer information in an automobile comprising:
    calculating a distance traveled by the automobile;
    storing the distance traveled in a first memory unit within a first automotive control module of the automobile; and
    storing the distance traveled in a second memory unit within a second automotive control module of the automobile,
    wherein said calculation of the distance traveled by the automobile is performed by a first processor and a second processor, each of the first and second processors being within the respective automotive control module.

2. The method of claim 1, further comprising storing the distance traveled in a third memory unit within a third automotive control module and displaying the distance traveled to a user of the automobile.

3. The method of claim 2, wherein the first, second, and third automotive control modules are in operable communication.

4. The method of claim 2, further comprising performing a security check between the first, second, and third automotive control modules.

5. The method of claim 4, wherein said performing of the security check comprises comparing a security check value stored within a plurality of the first, second, and third automotive control modules.

6. The method of claim 5, further comprising displaying an error message in a display device to the user if the security check values from the first, second, and third automotive control modules do not match.

7. The method of claim 6, further comprising locking the error message on the display device if the automobile is driven over a predetermined number of miles while the error message is displayed to the user.

8. The method of claim 7, wherein the first automotive control module and the second automotive control modules each include at least one of a body control module (BCM), an electronic control module (ECM), a powertrain control module (PCM), a transfer case shift control module, an inflatable restraint sensing and diagnostic module, a theft deterrent control module, a memory seat module, a driver information center (DIC), a suspension control module, and an electronic brake control module (EBCM).

9. The method of claim 8, wherein the third automotive control module is an instrument panel cluster (IPC).

10. The method of claim 9, further comprising rendering the automobile inoperative if at least one of the first and second automotive control modules is removed from the automobile.

11. A computing system for use in an automobile comprising:
    a first automotive control module comprising
        a first processor configured to calculate a distance traveled by the automobile,
        a first memory unit in operable communication with the first processor and configured to store the distance traveled by the automobile calculated by the first processor;
    a second automotive control module coupled to the first automotive control module and comprising
        a second processor configured to separately calculate the distance traveled by the automobile, and a second memory unit in operable communication with the second processor and configured to store the distance traveled by the automobile calculated by the second processor.

12. The computing system of claim 11, wherein the first automotive control module and the second automotive control module each include at least one of a body control module (BCM), an electronic control module (ECM), a powertrain control module (PCM), a transfer case shift control module, an inflatable restraint sensing and diagnostic module, a theft deterrent control module, a memory seat module, a driver information center (DIC), a suspension control module, and an electronic brake control module (EBCM) and further comprising an instrument panel cluster (IPC) including a third memory unit in operable communication with the at least one processor to store the distance traveled by the automobile and a display unit to display the distance traveled by the automobile to a user.

13. The computing system of claim 12, further comprising a third automotive control module that includes the third memory unit, and wherein the first automotive control unit is configured to perform a security check between the first, second, and third automotive control modules that includes comparing a security check value stored within a plurality of the first, second, and third automotive control modules, the third automotive control module configured to display an error message in a display device to the user if the security check values from the first, second, and third automotive control modules do not match and to lock the error message on the display device if the automobile is driven over a predetermined number of miles while the error message is displayed to the user.

14. An automobile comprising:
a frame;
a first automotive control module coupled to the frame including a first processor and a first memory storage unit, the first processor configured to calculate odometer information and the first memory storage unit configured to store the odometer information;
a second automotive control module coupled to the frame including a second processor and a second memory storage unit, the second processor configured to calculate the odometer information and the second memory storage unit configured to store the odometer information; and
a third automotive control module coupled to the frame including a third memory unit configured to store the odometer information and a display unit to display the odometer information to a user of the automobile.

15. The automobile of claim 14, wherein the automobile is inoperative if at least one of the first, second, and third automotive control modules is removed therefrom.

16. The automobile of claim 15, wherein the first automotive control module and the second automotive control module each include at least one of a body control module (BCM), an electronic control module (ECM), a powertrain control module (PCM), a transfer case shift control module, an inflatable restraint sensing and diagnostic module, a theft deterrent control module, a memory seat module, a driver information center (DIC), a suspension control module, and an electronic brake control module (EBCM) and the third automotive control module is an instrument panel cluster (IPC).

17. The automobile of claim 14, wherein the first automotive control unit is configured to perform a security check between the first, second, and third automotive control modules that includes comparing a security check value stored within a plurality of the first, second, and third automotive control modules, the third automotive control module configured to display an error message in a display device to the user if the security check values from the first, second, and third automotive control modules do not match and to lock the error message on the display device if the automobile is driven over a predetermined number of miles while the error message is displayed to the user.

* * * * *